(12) United States Patent
Kamath et al.

(10) Patent No.: US 6,487,490 B1
(45) Date of Patent: Nov. 26, 2002

(54) SPEED MODIFICATION SYSTEM FOR GAS TURBINE ENGINE TO ALLOW TRIMMING OF EXCESS

(75) Inventors: Deepak M. Kamath, Cincinnati, OH (US); Taylor J. Rosenfeld, Glendale, OH (US); Bruce G. Schings, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/507,411

(22) Filed: Feb. 18, 2000

Related U.S. Application Data

(60) Provisional application No. 60/136,013, filed on May 26, 1999.

(51) Int. Cl.[7] .............................. G06F 19/00; G06G 7/70
(52) U.S. Cl. .......................... 701/100; 701/99; 60/204; 60/243
(58) Field of Search ......................... 701/99, 100, 123; 60/204, 223, 243, 236, 238, 39.281, 235, 239, 233, 228, 39.14, 39.81, 39.76

(56) References Cited

U.S. PATENT DOCUMENTS

| 4,104,876 A | | 8/1978 | Larsen et al. ............. 60/226 R |
| 4,159,625 A | * | 7/1979 | Kerr ............................. 60/204 |
| 4,275,557 A | * | 6/1981 | Marvin et al. ............. 60/39.03 |
| 4,313,167 A | * | 1/1982 | Brown ........................ 60/243 |
| 4,344,141 A | | 8/1982 | Yates ......................... 364/442 |
| 4,380,898 A | | 4/1983 | Cantwell ................... 60/243 |
| 4,437,303 A | | 3/1984 | Cantwell ................. 60/39.281 |
| 5,394,689 A | * | 3/1995 | D'Onofrio ................... 60/204 |
| 5,622,045 A | * | 4/1997 | Weimer et al. ............... 60/204 |
| 6,000,215 A | * | 12/1999 | Roberts, Jr. ................... 60/204 |

FOREIGN PATENT DOCUMENTS

WO            358139            3/1990

* cited by examiner

Primary Examiner—Jacques H. Louis-Jacques
(74) Attorney, Agent, or Firm—Nathan D. Herkamp

(57) ABSTRACT

The present invention provides a fan speed indication system enabling the operator to control engine rotational speed to match specific thrust performance to flight requirements. The invention accommodates variations in engine thrust performance measured at manufacture or overhaul. In one embodiment, the invention provides an analog speed signal to flight control apparatus. The invention may also be configured to provide a digital speed signal to engine power management control apparatus.

10 Claims, 3 Drawing Sheets

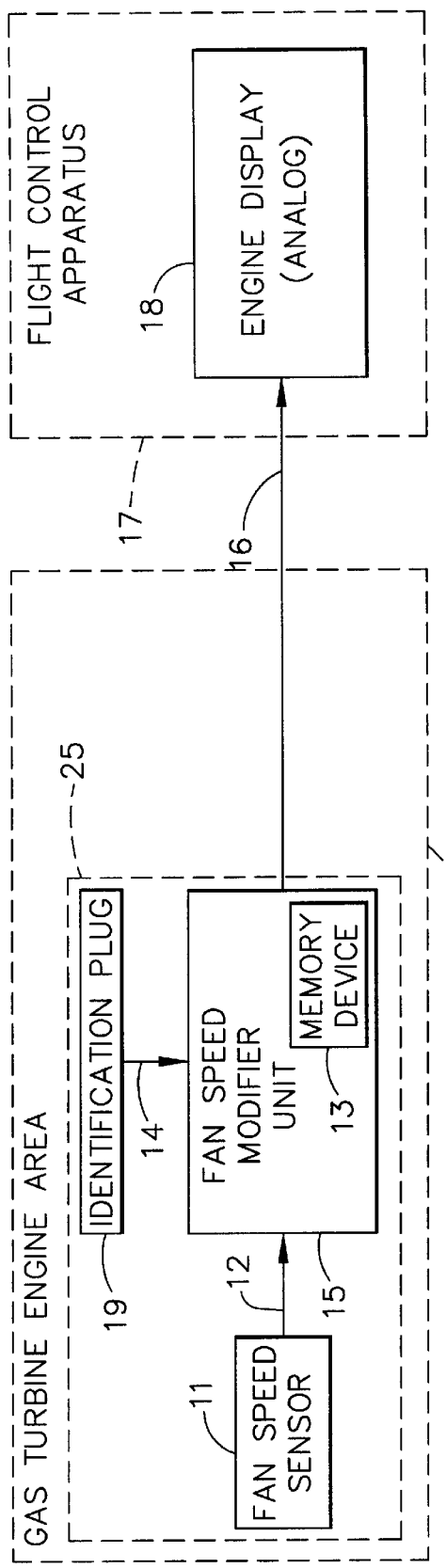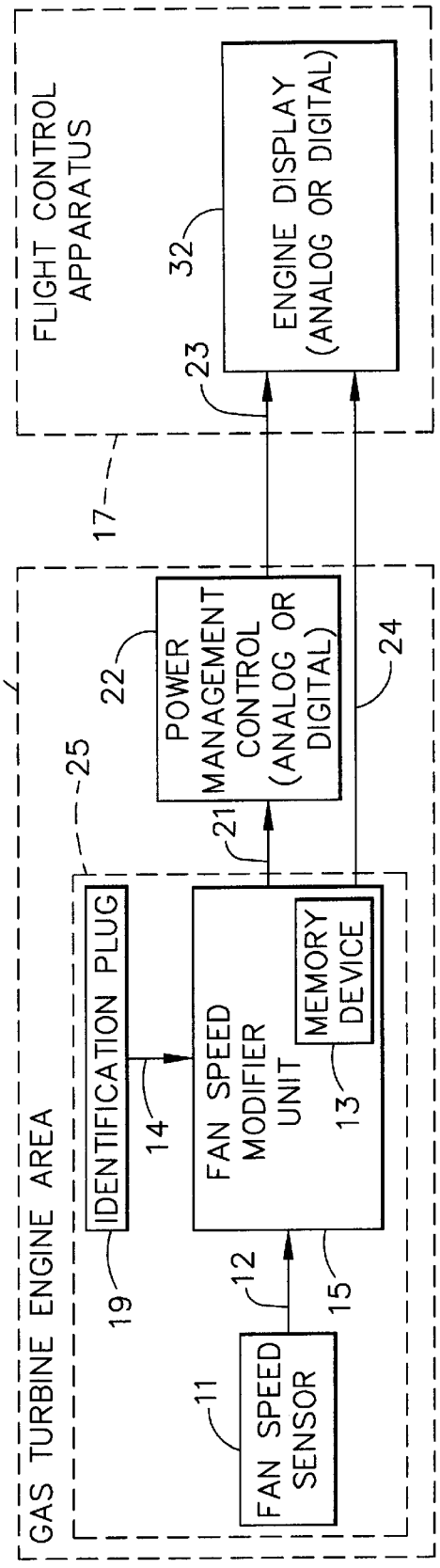

SPEED MODIFICATION SYSTEM FOR GAS TURBINE ENGINE TO ALLOW TRIMMING OF EXCESS

This application claims priority to the co-pending provisional patent application filed May 26, 1999, Ser. No. 60/136,013.

BACKGROUND OF THE INVENTION

1. Field of the Invention

The present invention relates to a system for thrust control of a gas turbine engine and, more particularly, to a system which provides a speed signal to the pilot that compensates for thrust performance variations in accordance with measured thrust performance characteristics of a particular gas turbine engine from the standard thrust performance characteristics of that engine model to enable the pilot to more accurately match engine thrust output to thrust requirements.

2. Discussion of the Background Art

Design, manufacture and control variations and accumulated tolerances of gas turbine engines cause variation in the operating characteristics from engine to engine within an engine model. One of these operating characteristics is thrust output. In order to provide safe operation of the aircraft, gas turbine engines are commonly designed to generate a predetermined minimum guaranteed or rated thrust level on any given engine regardless of variations in components and subsystems. In addition, pilots operate the aircraft according to predetermined engine model performance curves. These curves allow the pilot to set speed controls to provide the needed thrust for any engine of a model designation even if all accumulated variations in a particular engine are biased toward an engine configuration which produces minimum thrust output. Any engine having tolerances and variations, which are not limited to the least output configuration, will produce more thrust than can be effectively used by the aircraft under particular operating conditions. Excess thrust levels with accompanying higher operating temperatures result from higher than required engine rotational speed. The higher engine operating temperatures contribute to increased engine wear and deterioration which decrease the operating life of the engine.

In the Prior Art for gas turbine engines with hydromechanical fuel systems, the control architecture was designed such that the "minimum" or "worst case" engine performance produces the required thrust with margin at the target thrust setting parameter (fan speed). The target fan speed schedules are determined based on environmental conditions, engine performance characteristics and desired thrust rating. Due to the limitations in hydromechanical fuel systems, individual tailoring of the target fan speed schedules on an engine by engine basis has not been accomplished. Therefore, the thrust setting parameter schedule selected for the "minimum" or "worst case" engine performance produces a large population of engines with excess thrust.

SUMMARY OF THE INVENTION

The present invention is a rotational speed indication system for gas turbine engines with hydromechanical fuel controls that compensates for variations in thrust actually produced as compared to the nominal thrust. The invention uses predetermined engine model performance curves and actual engine performance data to calculate a modified thrust setting parameter (fan speed). Curves representing fan speed modification for a particular engine model are programmed into a memory device. Selection of a specific fan speed modification curve produces a speed indication that allows the pilot to more closely match engine thrust to a desired level of thrust. The generated output signal is then sent to the engine operator's fan speed signal display unit where the modified signal is used by the pilot to set the engine fan speed which corresponds to the desired thrust level. More particularly, the engine operator sets the engine throttle so that the modified fan speed signal matches the target fan speed corresponding to the desired thrust rating for the given ambient conditions. Since the target fan speed is set using the modified fan speed signal, the engine will run at a lower speed as compared to a target set using the unmodified fan speed signal. This in turn results in the gas turbine engine producing the needed thrust while eliminating excess thrust margin caused by the engine-to-engine variation, thus reducing engine temperatures and improving engine operating life.

BRIEF DESCRIPTION OF THE DRAWINGS

The structure, operation and advantages of the presently preferred embodiment of this invention will become apparent upon consideration of the following description, taken in conjunction with the accompanying figures in which like reference characters refer to like elements, and in which:

FIG. 2 is a schematic block diagram illustrating a preferred embodiment of the system for controlling gas turbine engine rotational speed in accordance with the present invention;

FIG. 4 is a schematic block diagram illustrating a second preferred embodiment of the system for controlling gas turbine rotational speed in accordance with the present invention.

OPERATION IN THE PREFERRED EMBODIMENT

Figure 1:
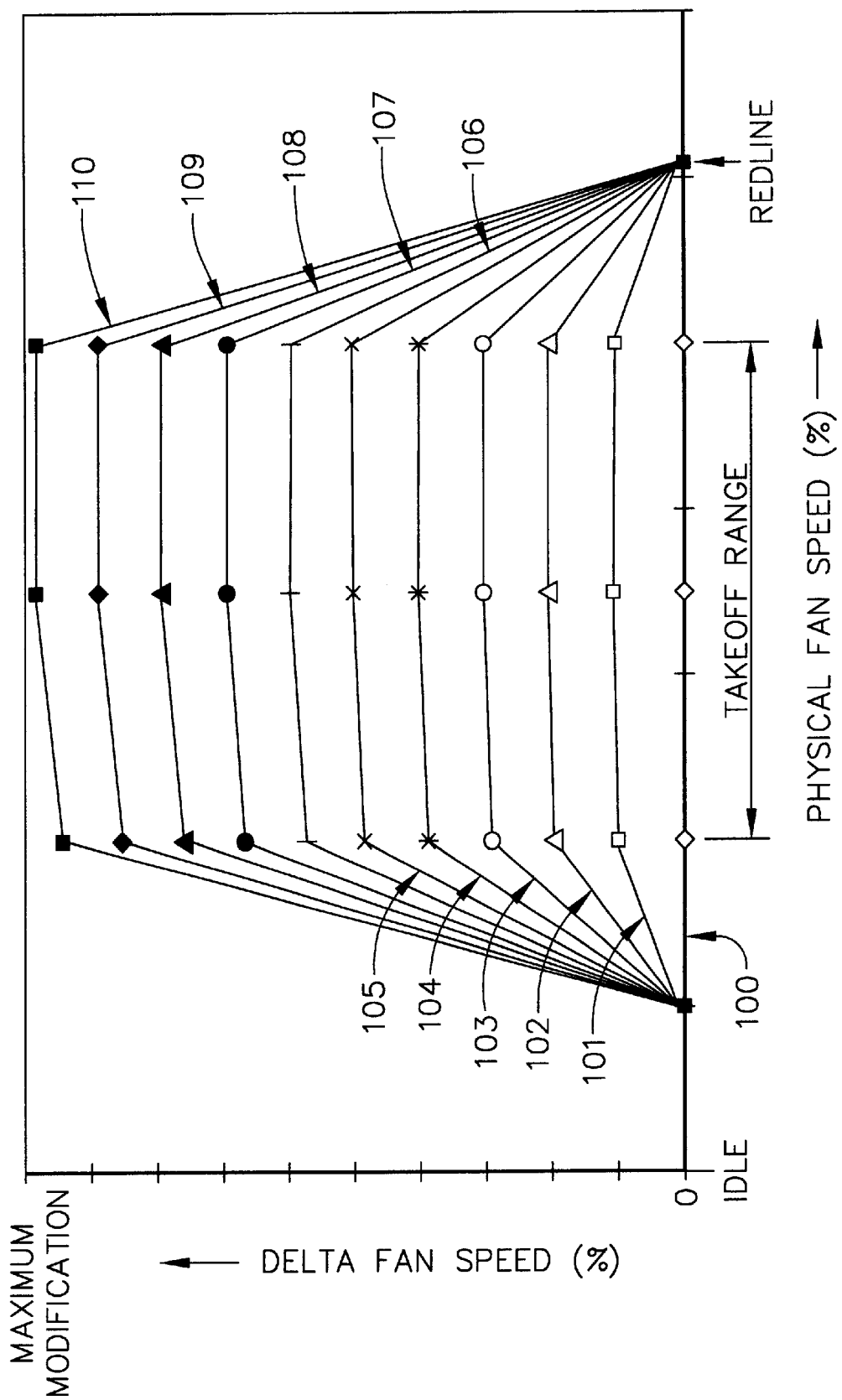
FIG. 1 is a graphical representation of fan speed modification levels used to provide thrust trimming for a range of engine thrust output variability.

By testing a sample of gas turbines of an engine model after the original manufacture, engine performance characteristic data for a particular model are determined. These performance characteristic data are used to generate fan speed modification characteristics representative of the differences in actual engine thrust output levels relative to nominal rotational speed within a given engine model. These generated fan speed modification characteristics show the corresponding change in fan speed needed to match actual thrust generated with nominal required thrust. FIG. 1 is a graphical representation of fan speed performance characteristics typical of members of an engine model versus a nominal speed setting showing the level of fan speed modification needed to produce the level of thrust expected at each particular speed setting. The fan speed performance characteristics 100–110 are empirically determined by evaluating a large number of engines of a particular model. The required speed modification varies with physical fan speed and the modification levels are largest at takeoff speeds, where engine performance deterioration due to high temperatures is greatest. Each of the characteristics 100–110 represents the speed performance of some members of an engine model family. Characteristic 100 shows nominal engine fan speed corresponding to the operator selected rotational speed for a particular gas turbine engine. Characteristics 101 through 109 show the predicted deviation of rotational speed from the nominal operator selected speed for selected groups of engines of the same engine type for which characteristic 100 represents nominal speed. Characteristic 110 shows the maximum predicted deviation of rotational speed from the nominal operator selected speed under normal operating conditions. The maximum deviation in rotational speed shown in characteristic 110 is selected to ensure that the actual thrust generated by the engine corresponding to the nominal setting selected by the operator provides required thrust plus safety margin. As shown on the lower left-hand section of FIG. 1, no correction is needed for gas turbine engines at idle speeds because no thrust is generated at idle. As the engine approaches takeoff speeds, the thrust output rises and the level of deviation of particular engines from nominal thrust levels rises. As the engine speed approaches the maximum engine operating conditions (redline), the level of modification declines sharply as maximum thrust output is selected by the pilot. No modification to the fan speed is made at redline, because redline is the maximum allowable operating speed.

The level of speed modification required to produce the required speed modification for a particular engine is based on individual engine test results, either following the initial manufacture or following subsequent engine overhauls. Once the individual engine test results are obtained, the engine thrust performance characteristics are measured against the nominal thrust output for that particular engine model, so that the appropriate level of speed modification can be determined in order to select which of the characteristics 101–109 is best suited to modify the speed indication for that particular engine to match actual thrust to nominal thrust. The present invention modifies the real-time fan speed signal so that the speed indication provided to the engine operator is adjusted to compensate for measured variations above the standard thrust output for that particular engine.

FIG. 2 illustrates the fan speed modification system 25 for a gas turbine engine 10 and a flight control apparatus 17. Fan speed sensor 11 is connected via conductor 12 to the fan speed modifier unit (FSMU) 15. A memory device 13, contained within FSMU 15, is programmed with gas turbine engine specific fan speed characteristics, such as for example, the characteristics found in FIG. 1. A fan speed modification level selection device or identification plug 19 is connected to FSMU 15 via conductor 14. The FSMU 15 produces an output, which is delivered via conductor 16 to the engine display 18 within the flight control apparatus 17.

Figure 3:
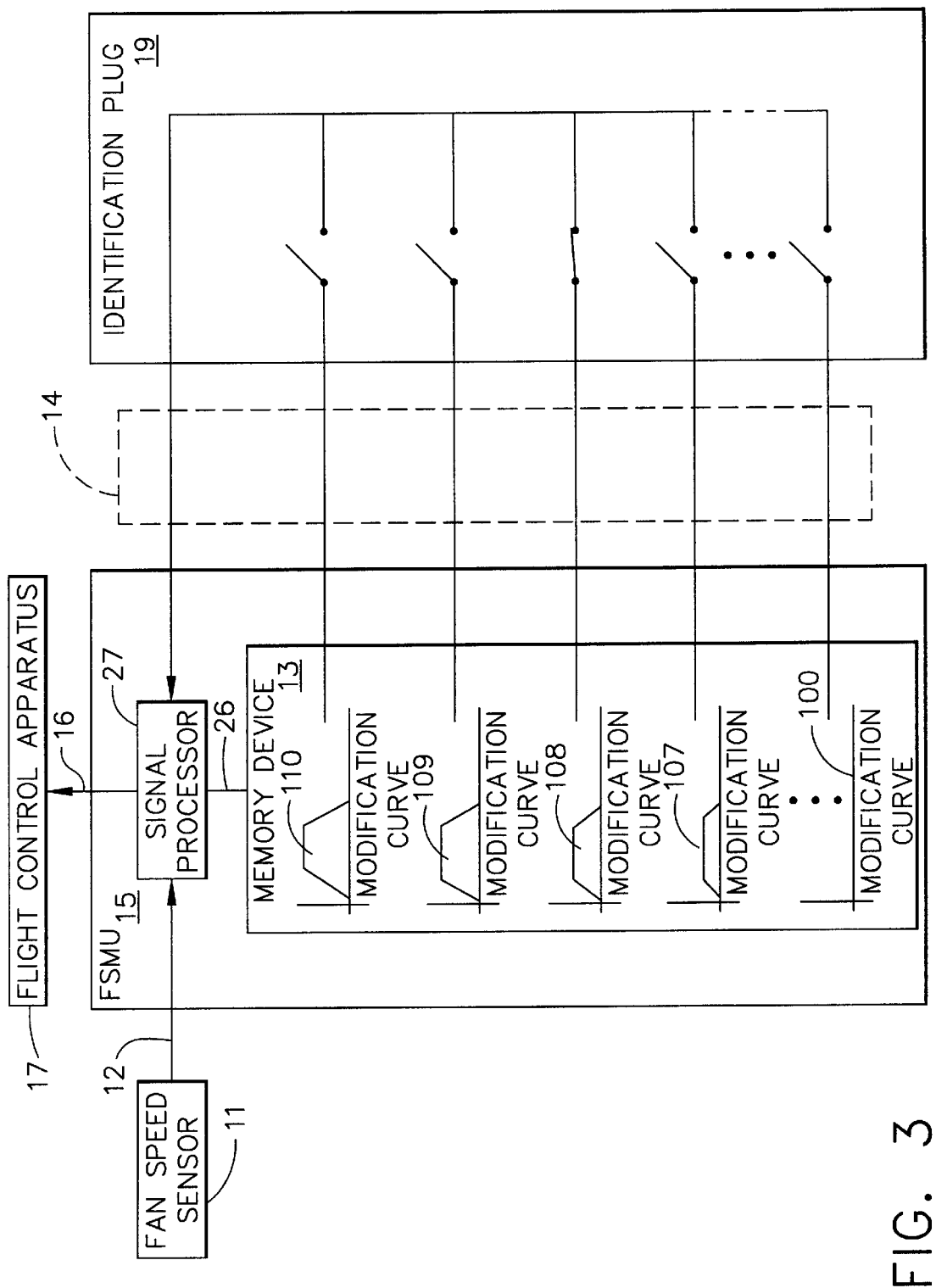
FIG. 3 is a schematic block diagram illustrating a fan speed modification system for use in the present invention.

In operation, the actual (real-time) fan speed signal is modified within speed modification system 25 and then sent to flight control apparatus 17 via conductor 16. FIG. 3 illustrates a schematic block diagram of speed modification system 25 of FIG. 2. A schematic diagram of the fan speed modification level selection device or identification plug 19 connected to FSMU 15 via conductor 14 is shown. In a preferred embodiment, the fan speed modification level selection device or identification plug 19 has a plurality of connector pins configured to mate with electrical sockets of FSMU 15. The electrical circuitry contained in identification plug 19 is designed such that a fan speed characteristic for a particular engine is selected from memory device 13. By example, FIG. 3 illustrates that the information pertinent to modification curve 108 in memory device 13 is selected, while the information relative to all other modification curves remains unselected. To achieve the physical configuration corresponding to the selection of characteristic 108 as shown in FIG. 3, a pair of pins of the plug 19 would be connected when the plug 19 is inserted into memory device 13, such that the circuitry corresponding to the selection of characteristic 108 of FIG. 3 is activated. The other pins of plug 19 would be inactivated, by for example, leaving the pins disconnected to prevent activation of an inappropriate modification signal. A collection of identification plugs 19 would include a plurality of plugs at least one of which is configured to select each of the characteristics 100–110 shown in FIG. 1 for a particular engine model, so that after testing a particular engine's thrust performance, the plug providing the needed activation could be inserted into the circuit to provide, as output from memory device 13, the required modification level to control a particular engine.

Once the identification plug 19 selects the appropriate fan speed characteristic, the fan speed characteristic data (or modification curve data) is sent to the signal processor 27 via conductor 26. The actual fan speed is sensed by fan speed sensor 11 and transmitted to signal processor 27 via conductor 12. Signal processor 27 sums the signals received from conductor 26 and conductor 12 to produce a modified fan speed signal. The modified fan speed signal is sent to the flight control apparatus 17 via conductor 16.

In a preferred embodiment, the modified fan speed signal is analog. The modified fan speed signal is provided to the engine display 18 within the flight control apparatus 17 of FIG. 2 and FIG. 3, such that the modified fan speed signal value is larger than the actual gas turbine engine speed value in the takeoff range. This larger indicated fan speed value informs the engine operator that the throttle setting may be reduced to the targeted fan speed which is required to produce the required thrust for the particular engine. Reduction in the throttle setting in turn reduces actual fan speed by reducing fuel consumption. The speed modification system 25 performs self diagnosis to ensure proper operation, so that in the event of operational failure, an unmodified fan speed signal, such as characteristic 100 of FIG. 1, will be transmitted to the flight control apparatus 17.

OPERATION IN A SECOND PREFERRED EMBODIMENT

Referring now to the embodiment illustrated in FIG. 4, the fan speed modification system for a gas turbine engine 20 and the flight control apparatus 17 is identical to the system depicted in FIG. 2, except that gas turbine engine 20 of FIG. 4 includes an electronic supervisory control known as a power management control (PMC) 22, and flight control apparatus 17 of FIG. 4 includes an engine display 32 with at least one analog and at least one digital input. The FSMU 15 includes an output connected to the engine display 32 via conductor 24 as well as an output to the PMC 22 via conductor 21. Depending on the specific application, the PMC provides either an analog or digital output via conductor 23 to the engine display 32. In this preferred embodiment, the engine display 32 requires at least two fan speed indication inputs, one provided by the PMC 22 and the other provided by the fan speed sensor 11 (via the FSMU 15 and conductor 24). In an alternate embodiment, the resulting summed signal is sent via conductor 21 to PMC 22, and to the flight control apparatus via conductor 24, as depicted in FIG. 4.

Although the present invention has been described in terms of its preferred embodiments, it will be apparent to those skilled in the art that changes and modifications thereof may be made without departing from the scope of the appended claims that define the present invention.

What is claimed is:

1. A system for providing a modified fan speed signal for a gas turbine engine having a hydromechanical fuel control system comprising:
   a) a memory device for storing fan speed modification level data as a plurality of fan speed modification characteristics;
   b) at least one speed monitor for measuring real time rotational fan speed of the gas turbine engine and providing an output signal representing real time speed;
   c) an identification plug containing electrical circuitry for activating a fan speed modification characteristic output from said memory device determined by testing of the specific engine being controlled to match actual engine thrust for said specific engine to the nominal thrust profile; and
   d) a signal processor for combining said fan speed modification characteristic output and said real time speed to generate a modified fan speed signal.

2. A system according to claim 1, wherein said fan speed modification characteristic output is empirically matched to a predetermined level of thrust performance provided by said engine at each nominal rotational speed.

3. A system according to claim 1 wherein said signal processor provides said modified fan speed signal to a power management control system.

4. A system according to claim 3 wherein said power management control system provides at least one of an analog and digital signal to a flight control apparatus.

5. A system according to claim 1 wherein said signal processor provides as an output said modified fan speed signal to a flight control apparatus.

6. A system according to claim 1 which provides for the transmission of an unmodified, real time fan speed signal in case of system failure.

7. A method for controlling a gas turbine engine having a hydromechanical fuel control system comprising the steps of:
   a) sensing rotational fan speed using a speed monitor for providing a real time fan speed signal;
   b) providing a predetermined one of a plurality of engine specific speed modification signals from a memory device for a particular engine being monitored, wherein said plurality of engine specific speed modification signals are based on individual engine test results; and
   c) summing said real time fan speed signal and said predetermined one of said engine specific speed modification signals to provide a modified fan speed signal.

8. A method according to claim 7 further comprising the step of providing said modified fan speed signal to a flight control apparatus.

9. A method according to claim 7 further comprising the step of providing said modified fan speed signal to a power management control system.

10. A method according to claim 9 for providing at least one of an analog and digital signal to a flight control apparatus.

* * * * *